(12) United States Patent
Kaneko et al.

(10) Patent No.: US 8,150,551 B2
(45) Date of Patent: Apr. 3, 2012

(54) CHARGING APPARATUS FOR MOBILE ROBOT

(75) Inventors: Satoshi Kaneko, Wako (JP); Takashi Nakayama, Wako (JP); Koji Okazaki, Wako (JP); Yuta Kimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 677 days.

(21) Appl. No.: 12/327,263

(22) Filed: Dec. 3, 2008

(65) Prior Publication Data

US 2009/0149995 A1   Jun. 11, 2009

(30) Foreign Application Priority Data

Dec. 6, 2007   (JP) .................................. 2007-316250

(51) Int. Cl.
  *B65H 59/00*   (2006.01)
(52) U.S. Cl. ........................................ 700/258; 455/462
(58) Field of Classification Search .................. 700/258; 901/1; 320/107–109, 112, 114; 455/462; 439/136; 318/6, 568.12, 568.16
See application file for complete search history.

(56) References Cited

U.S. PATENT DOCUMENTS

| 4,736,826 A * | 4/1988 | White et al. ............. 191/12.2 A |
| 5,534,762 A * | 7/1996 | Kim .......................... 318/568.12 |
| 7,227,334 B2 * | 6/2007 | Yang et al. .................... 320/107 |

FOREIGN PATENT DOCUMENTS

| JP | 05-276675 | 10/1993 |
| JP | 2001-179663 | 7/2001 |
| JP | 2002-042946 | 2/2002 |
| JP | 2006-244020 | 9/2006 |

* cited by examiner

*Primary Examiner* — Dalena Tran
(74) *Attorney, Agent, or Firm* — Rankin, Hill & Clark LLP

(57) ABSTRACT

A charging apparatus for a mobile robot enabling the mobile robot to move relatively freely even during charging using a wiring member, while preventing occurrence of an inconvenience such as damage to the wiring member, is provided. The charging apparatus includes a charging power source, a control board which controls the charging power source, and a wiring members for use in supplying electric power from the charging power source to a battery mounted on the mobile robot. The wiring member is connected to the mobile robot to follow the movement of the robot. The charging apparatus further includes a detector which detects tension applied to the wiring member. When the wiring members is pulled, an appropriate measure to stop the mobile robot or disconnect the wiring member from the robot is taken in accordance with a signal from the tension detector.

8 Claims, 3 Drawing Sheets

CHARGING APPARATUS FOR MOBILE ROBOT

BACKGROUND OF THE INVENTION

1. Field of the Invention

The present invention relates to an apparatus for charging a battery mounted on a mobile robot.

2. Description of the Related Art

There is conventionally known an apparatus for charging a mobile robot wherein a power-receiving connector is provided in place of the mobile robot and connected to a battery mounted on the robot, and a charging station including a charging power source and a power-feeding connector connected to the charging power source is installed within a range reachable by the mobile robot. With movement of the mobile robot, the power-receiving connector is connected to the power-feeding connector at the charging station for charging the battery by the charging power source (see, for example, Japanese Patent Application Laid-Open No. 2001-179663).

According to this apparatus, when the battery level is lowered, the mobile robot is capable of autonomously moving to the place where the charging station is installed, and having the power-receiving connector connected to the power-feeding connector for automatic charging.

In this conventional apparatus, however, the power-feeding connector is fixedly provided in the charging station. This means that the mobile robot has its movement restricted by the power-feeding connector via the power-receiving connector during charging, resulting in a considerably lowered degree of freedom in movement of the mobile robot. As such, the entertaining property of the mobile robot cannot be exerted effectively during charging, which would make the audience disappointed.

If a wiring member having one end connected to a charging power source has its other end connected to the mobile robot to allow the wiring member to follow the movement of the robot, the mobile robot will be able to move in a relatively wide range during charging. The restricted length of the wiring member, however, may cause an inconvenience such as damage to the wiring member when the mobile robot makes a movement large enough to pull the wiring member.

SUMMARY OF THE INVENTION

In view of the foregoing, an object of the present invention is to provide a charging apparatus for a mobile robot which allows the mobile robot to move relatively freely even during charging using a wiring member, and which also prevents occurrence of an inconvenience such as damage to the wiring member.

To achieve the above object, the present invention provides a charging apparatus for charging a battery mounted on a mobile robot, which includes: a charging power source; a control board which controls the charging power source; a wiring member connected to the mobile robot to follow movement of the mobile robot and supplying electric power from the charging power source to the battery mounted on the mobile robot; and a tension detector which detects tension applied to the wiring member.

According to the present invention, the battery is charged via the wiring member which follows the movement of the mobile robot. This allows the mobile robot to move relatively freely even during charging, and accordingly, the entertaining property of the mobile robot can effectively be exerted to entertain the audience. When the wiring member is pulled due to an excessive movement of the mobile robot, the tension detector detects the tension applied to the wiring member.

The control board may be configured to transmit a motion restriction signal to the mobile robot in the event that the tension detector detects the tension applied to the wiring member, to instruct the mobile robot that its movement should be restricted. The signal may be a signal prohibiting the movement of the mobile robot in the direction away from the charging apparatus, a signal causing the mobile robot to move in the direction approaching the charging apparatus, or a signal causing the mobile robot to stop. This configuration can prevent the wiring member from being further pulled and, hence, avoid occurrence of an inconvenience such as damage to the wiring member. It is noted that a plurality of kinds of motion restriction signals may be transmitted to the mobile robot in a stepwise manner in accordance with the magnitude of the tension applied to the wiring member.

Further, the control board may be configured to stop power supply from the charging power source in response to the tension detector detecting the tension applied to the wiring member. This allows the power supply to be stopped automatically in the event that the wiring member is pulled, without the need of manual intervention of an operator, which advantageously implements a failsafe mechanism.

DESCRIPTION OF THE PREFERRED EMBODIMENTS

Figure 1:
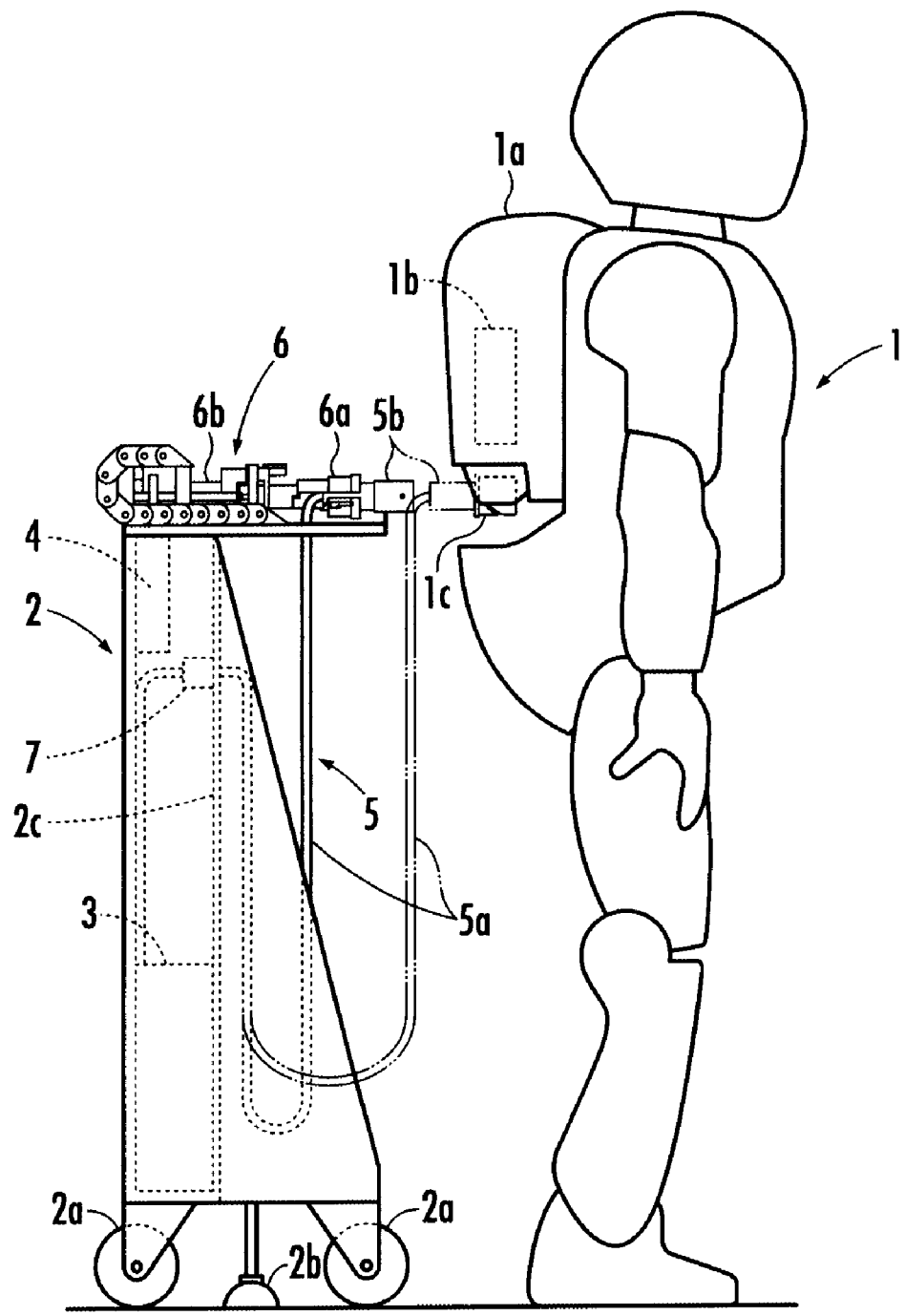
FIG. 1 is a side view of the charging apparatus according to an embodiment of the present invention.

FIG. 1 shows a humanoid mobile robot 1 and a charging station 2 which is an apparatus for charging the mobile robot 1. The mobile robot 1 has a control box 1a at the back, which houses a battery 1b therein. The mobile robot 1 also has a power-receiving connector 1c provided beneath the control box 1a and connected to the battery 1b.

The charging station 2 is provided with a charging power source 3, a control board 4 which controls the charging power source 3, and a wiring member 5 connected to the charging power source 3. The charging station 2 is freely movable by means of wheels 2a attached to its bottom. Also attached to the bottom of the charging station 2 is a stopper 2b, which can be raised and lowered freely. Lowering the stopper 2b can set the charging station 2 in a predetermined installation location.

The wiring member 5 includes a cable 5a having one end connected to the charging power source 3, and a power-feeding connector 5b attached to the other end of the cable 5a. A connector mating/unmating device 6 is mounted on top of the charging station 2. The connector mating/unmating device 6 is controlled by the control board 4 to mate and unmate the power-feeding connector 5b and the power-receiving connector 1c. The mating/unmating device 6 has a connector holder 6a for holding the power-feeding connector 5b, and an actuator 6b for moving the connector holder 6a forward and backward.

The cable 5a is provided with a power-feeding line connected to the charging power source 3 as well as a signal line connected to the control board 4. The power-feeding connector 5b and the power-receiving connector 1c each include not only a power-feeding terminal but also a signal terminal to allow two-way communication between the control board 4 and the mobile robot 1.

When the battery level of the battery 1b is lowered, the mobile robot 1 autonomously moves to the place where the charging station 2 is installed, and stops at a predetermined charging position where the power-receiving connector 1c is directly in front of the power-feeding connector 5b. The connector mating/unmating device 6 is provided with a robot position sensor (not shown) which detects when the mobile robot 1 reaches the charging position, and a signal from the robot position sensor is input to the control board 4. The control board 4, in receipt of the signal from the robot position sensor, carries out charging control.

Figure 3:
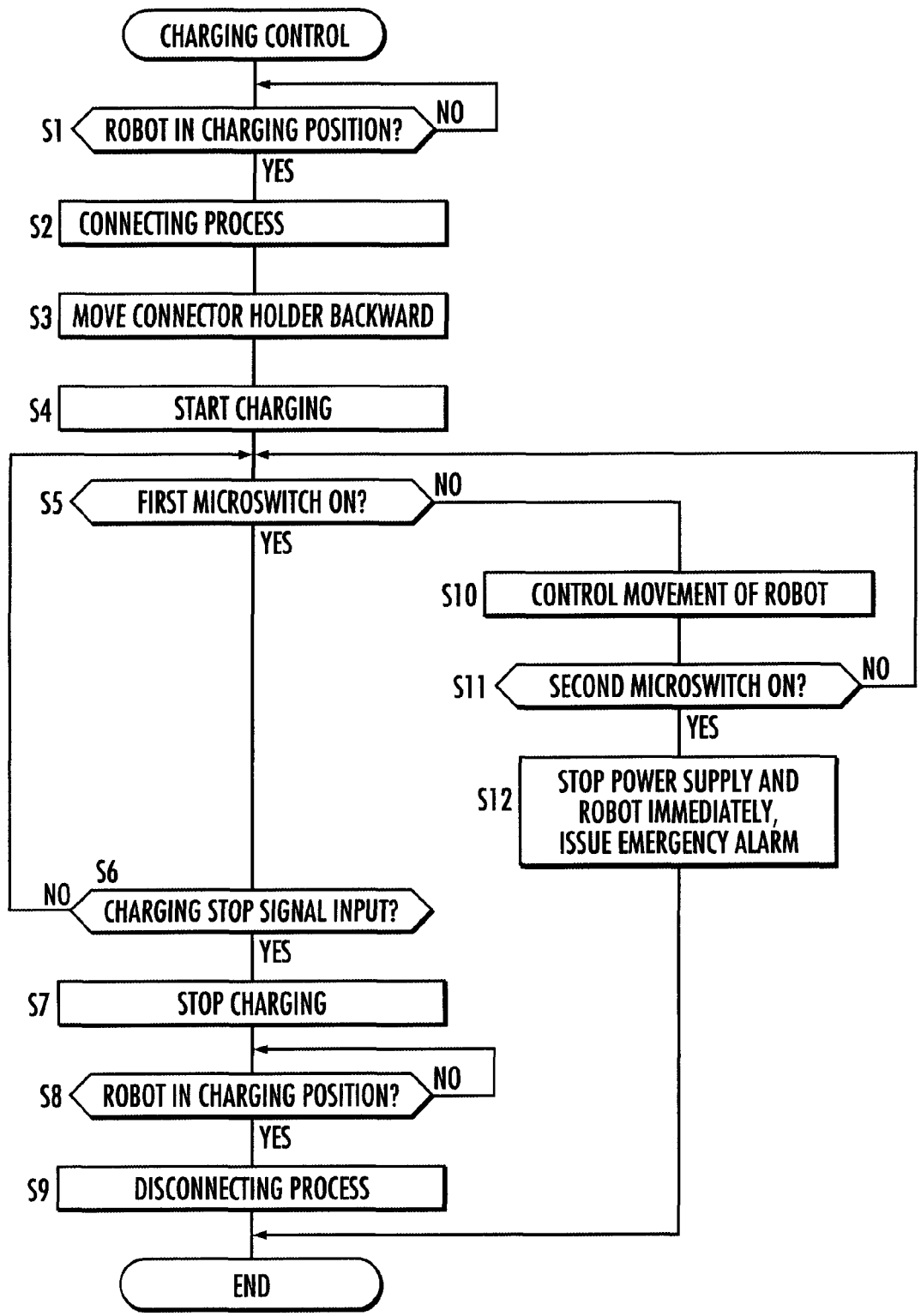
FIG. 3 is a flowchart illustrating charging control which is performed by a control board of the charging apparatus of the embodiment.

FIG. 3 illustrates the charging control in detail. Firstly, it is determined whether the mobile robot 1 has reached the charging position based on a signal from the robot position sensor (S1). If it is determined that the robot has reached the charging position, the process of connecting the wiring member 5 to the mobile robot 1 is performed (S2). In this process, the actuator 6b of the connector mating/unmating device 6 is activated to move the connector holder 6a forward, to thereby connect the power-feeding connector 5b held by the connector holder 6a to the power-receiving connector 1c. At this time, the power-feeding connector 5b is rotated via the connector holder 6a to lock the power-feeding connector 5b with the power-receiving connector 1c. Upon completion of the connecting process, the connector holder 6a is moved backward (S3). Next, a charging condition is transmitted from the mobile robot 1 to the control board 4 to start charging of the battery 1b by the charging power source 3 under that condition (S4).

When the connector holder 6a is moved backward, the connector holder 6a is disengaged from the power-feeding connector 5b, causing the mobile robot 1 to be connected to the charging station 2 only via the wiring member 5, as shown by a phantom line in FIG. 1. This allows the mobile robot 1 to move freely within the range where the wiring member 5 has slack and, thus, allows the mobile robot 1 to effectively exert its property of entertaining the audience.

Next, it is determined whether a first microswitch 71, which will be described later, is ON (S5). If so, it is determined whether a charging stop signal has been input, which signal is to be output from the mobile robot 1 upon completion of charging of the battery 1b (S6). If the charging stop signal is input, charging of the battery 1b with the charging power source 3 is stopped (S7). At this time, the mobile robot 1 moves to return to the above-described charging position. When it is determined that the mobile robot 1 has returned to the charging position based on a signal from the robot position sensor (S8), the process of disconnecting the wiring member 5 from the mobile robot 1 is performed (S9). In this disconnecting process, the connector holder 6a is moved forward to hold the power-feeding connector 5b connected to the power-receiving connector 1c, and then, the power-feeding connector 5b is turned in the unlocking direction via the connector holder 6a to release the lock. Thereafter, the connector holder 6a is moved backward to disconnect the power-feeding connector 5b from the power-receiving connector 1c. This causes the mobile robot 1 to return to the completely free state shown by a solid line in FIG. 1.

In the event that the mobile robot 1 moves too largely during charging due to a malfunction or the like, or if the wiring member 5 is shorter than a normal length, the wiring member 5 may be pulled during charging, in which case the wiring member 5 may be damaged or the charging station 2 may topple over. In view of the foregoing, according to the present embodiment, the charging station 2 is provided with a tension detector 7 which detects tension applied to the wiring member 5.

Figure 2:
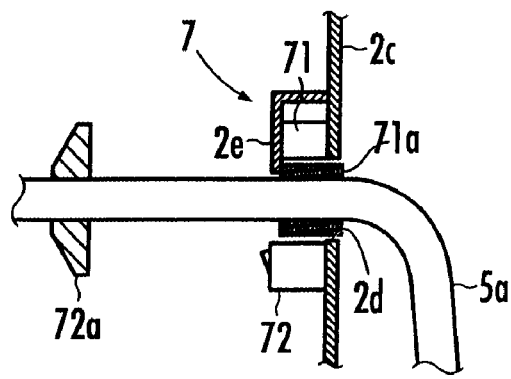
FIG. 2(a) illustrates a tension detector of the charging apparatus of the embodiment.
FIG. 2(b) illustrates the operation of a first microswitch in response to the tension applied to the wiring member.
FIG. 2(c) illustrates the operation of a second microswitch in response to the tension applied to the wiring member.
Figure 2:
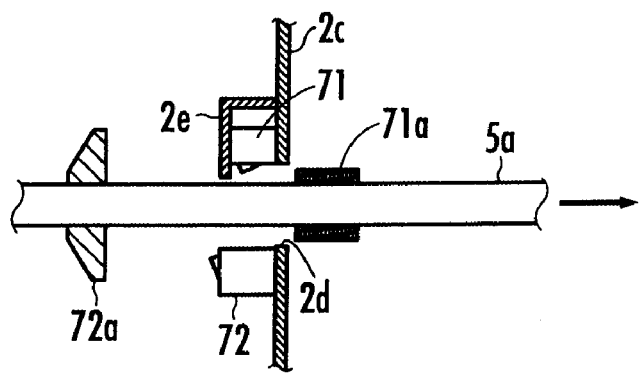
Figure 2:
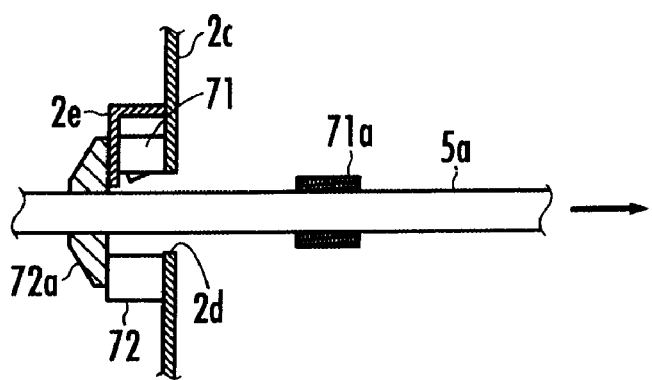

The tension detector 7, as shown in FIG. 2(a), has a pair of first and second microswitches 71 and 72, which are arranged at an opening of a frame 2c provided at the charging station 2 through which the wiring member 5 is lead out. The first microswitch 71 cooperates with a collar 71a fixedly secured to the cable 5a of the wiring member 5. When the cable 5a of the wiring member 5 is pulled by an excessive motion of the mobile robot 1 to cause the collar 71a to be pulled out forward from the cable lead-out opening 2d of the frame 2c, as shown in FIG. 2(b), the first microswitch 71 turns OFF.

The second microswitch 72 cooperates with a collar-shaped stopper 72a, which is fixedly secured to the cable 5a at the position behind the collar 71a. When the collar 71a is pulled out and the cable 5a is further pulled out ahead of the frame 2c, the stopper 72a abuts against a support plate 2e fixedly secured to the frame 2c, as shown in FIG. 2(c), to prevent the cable 5a from being pulled out any further. The second microswitch 72 turns ON when the stopper 72a abuts against the support plate 2e. Accordingly, the tension detector 7 of the present embodiment is capable of detecting the pulled level of the wiring member 5 in a stepwise manner by means of the first microswitch 71 and the second microswitch 72.

Signals from the first and second microswitches 71 and 72 are input to the control board 4. The control board 4 determines whether the first microswitch 71 is ON after initiation of charging, as described above (S5), and when the first microswitch 71 turns OFF, it transmits a first motion restriction signal to the mobile robot 1 informing that the movement of the robot 1 should be restricted (S10). In receipt of this signal, the mobile robot 1 ceases to further move to the direction away from the charging station 2. It is noted that the first motion restriction signal may be a signal causing the mobile robot 1 to move in the direction approaching the charging station 2.

Next, it is determined whether the second microswitch 72 has turned ON (S1). The process returns to step S5 until the second microswitch 72 turns ON. When the mobile robot 1 moves toward the charging station 2, the collar 71a is pulled backward through the lead-out opening 2d by means of a cable pull-in mechanism, not shown, so that the first microswitch 71 turns ON. In this case, the process proceeds to step S6, and the normal charging control as described above is carried out.

On the other hand, if the wiring member 5 is continuously pulled due to the malfunction or the like even after the first motion restriction signal is transmitted to the mobile robot 1, causing the second microswitch 72 to turn ON, the power supply from the charging power source 3 is stopped immediately, and a second motion restriction signal is transmitted to the mobile robot 1 to stop the mobile robot 1 immediately, and furthermore, an emergency alarm is issued from a buzzer or the like (S12). This prevents the wiring member 5 from being damaged due to an excessive tensile force, and also prevents the charging station 2 from toppling over. Further, the power supply from the charging power source 3 is automatically stopped, without the need of intervention of the operator, which implements a failsafe mechanism.

While the embodiment of the present invention has been described above with reference to the drawings, the present invention is not restricted thereto. For example, while the tension detector 7 is made up of the microswitches 71 and 72 in the above embodiment, a reel winding the wiring member 5 with a predetermined force may be provided, in which case the tension detector may be configured with a sensor which detects feed of the wiring member from the reel. Further, the tension detector may be configured with a force sensor such as a strain gauge attached to the wiring member 5. Still further, the lock mechanism for locking the power-feeding connector 5b with the power-receiving connector 1c may be provided with a mechanical sensing unit which senses tension of the wiring member 5, in which case when the tension of the wiring member 5 becomes more than a predetermined level, the movement of the sensing unit may release the lock to disconnect the power-feeding connector 5b from the power-receiving connector 1c. In this case, the sensing unit serves as the tension detector.

What is claimed is:

1. A charging apparatus for charging a battery mounted on a mobile robot, comprising:
    a charging power source;
    a control board which controls the charging power source;
    a wiring member having an end connected to the charging power source and another end connected to the mobile robot and following movement of the mobile robot, electric power being supplied from the charging power source via the wiring member to the battery mounted on the mobile robot; and
    a tension detector which detects a first predetermined tension applied to the wiring member and a second predetermined tension applied to the wiring member,
    wherein when the tension detector detects the first predetermined tension applied to the wiring member, the control board transmits a motion restriction signal to the mobile robot to instruct that the movement of the mobile robot should be restricted, and when the tension detector detects the second predetermined tension applied to the wiring member, the control board stops supply of the electric power from the charging power source.

2. The charging apparatus for a mobile robot according to claim 1, wherein the second predetermined tension is greater than the first predetermined tension.

3. The charging apparatus for a mobile robot according to claim 1, wherein the tension detector further comprises:
    a first microswitch configured to detect the first predetermined tension applied to the wiring member; and
    a second microswitch configured to detect the second predetermined tension applied to the wiring member.

4. A charging apparatus for charging a battery mounted on a mobile robot, comprising:
    a charging power source;
    a control board which controls the charging power source;
    a wiring member having an end connected to the charging power source and another end connected to the mobile robot and following movement of the mobile robot, electric power being supplied from the charging power source via the wiring member to the battery mounted on the mobile robot; and
    a tension detector which detects tension applied to the wiring member,
    wherein in the case where the tension detector detects the tension applied to the wiring member, the control board transmits a motion restriction signal to the mobile robot to instruct that the movement of the mobile robot should be restricted.

5. The charging apparatus for a mobile robot according to claim 4, wherein the motion restriction signal is a signal prohibiting movement of the mobile robot in a direction away from the charging apparatus.

6. The charging apparatus for a mobile robot according to claim 4, wherein the motion restriction signal is a signal causing the mobile robot to move in a direction approaching the charging apparatus.

7. The charging apparatus for a mobile robot according to claim 4, wherein the motion restriction signal is a signal causing the mobile robot to stop.

8. A charging apparatus for charging a battery mounted on a mobile robot, comprising:
    a charging power source;
    a control board which controls the charging power source;
    a wiring member having an end connected to the charging power source and another end connected to the mobile robot and following movement of the mobile robot, electric power being supplied from the charging power source via the wiring member to the battery mounted on the mobile robot; and
    a tension detector which detects tension applied to the wiring member,
    wherein in the case where the tension detector detects the tension applied to the wiring member, the control board stops supply of the electric power from the charging power source.

* * * * *